United States Patent
Wang et al.

(10) Patent No.: US 6,703,736 B2
(45) Date of Patent: Mar. 9, 2004

(54) MAGNETIC BEARING

(75) Inventors: Chien-Chang Wang, Hsinchu Hsien (TW); Shyh-Jier Wang, Hsinchu Hsien (TW); Hung-Kuang Hsu, Taipei (TW); Yu-Hsiu Chang, Changhua Hsien (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 10/173,626

(22) Filed: Jun. 19, 2002

(65) Prior Publication Data

US 2003/0117031 A1 Jun. 26, 2003

(30) Foreign Application Priority Data

Dec. 24, 2001 (TW) ........................................ 90131985 A

(51) Int. Cl.$^7$ ................................................. H02K 7/09
(52) U.S. Cl. ..................................... 310/90.5; 310/67 R
(58) Field of Search ............................... 310/90.5, 67 R

(56) References Cited

U.S. PATENT DOCUMENTS

| | | | |
|---|---|---|---|
| 4,340,260 A | 7/1982 | Forster et al. | 308/10 |
| 5,545,937 A | 8/1996 | Dunfield et al. | 310/90.5 |
| 5,619,083 A | 4/1997 | Dunfield et al. | 310/90.5 |
| 5,783,866 A * | 7/1998 | Hong | 310/90.5 |
| 6,097,120 A * | 8/2000 | Horng | 310/90.5 |

* cited by examiner

Primary Examiner—Thanh Lam
(74) Attorney, Agent, or Firm—Bacon & Thomas, PLLC

(57) ABSTRACT

A magnetic bearing includes a base, a spindle rotatably mounted onto the base and a magnetic portion mounted between the base and the spindle to provide a magnetic repulsion that suspends the spindle. The magnetic portion further includes an inner magnetic portion and an outer magnetic portion that repulse against each other. The outer magnetic portion is located around the inner magnetic portion so that the inner magnetic portion and the spindle are suspended. Therefore, mechanical friction in the magnetic bearing is minimized.

9 Claims, 2 Drawing Sheets

MAGNETIC BEARING

BACKGROUND OF THE INVENTIONS

1. Field of the Invention

The present invention relates to the field of magnetic bearings, and more specifically to the field of passive magnetic bearings.

2. Description of Related Art

In any spinning system, for example, a motor of a CD-ROM device or a motor of a heat-dissipating fan, the selection of a bearing is very important in order to maintain the stability and prolong the life of the spinning system. The key point in prolonging the life of the bearing lies in how to reduce the mechanical friction between the bearing and a spindle.

Conventional bearings can be divided into two main categories, that is, ball bearings and self-lubricating bearings. The self-lubricating bearings have the advantage of low price, but also have the disadvantage of short life. The ball bearings have the advantage of long life, but also have the disadvantage of high price and poor impact resistibility.

Therefore, in order to overcome the disadvantages of the traditional bearings, magnetic bearings have been invented. The magnetic bearings make use of magnetic force to suspend spinning components thereof, and thus have the advantages of being non-engaging and non-lubricating. Conventional magnetic bearings can be roughly divided into three categories and are presented as following:

Firstly, U.S. Pat. No. 5,545,937 discloses a spindle motor assembly including a magnetic bearing and a hydrodynamic bearing, wherein the magnetic bearing further including a pair of single pole magnetic rings complementary to each other. The advantage of the spindle motor is that it is convenient to assemble. The disadvantage is that the hydrodynamic bearing may still cause substantial mechanical friction and moreover the spindle motor includes radially-charged magnets which are not easy to produce.

Secondly, U.S. Pat. No. 5,619,083 discloses a passive magnetic bearing including a hydrodynamic bearing and a pair of multiple pole magnetic rings complementary to each other so that high stiffness is created. The advantage of the magnetic bearing is that it consists of axially-charged magnets which are convenient for mass production. However, the disadvantage again arises from the possible mechanical friction caused by the hydrodynamic bearing.

Thirdly, U.S. Pat. No. 4,340,260 discloses a magnetic suspension bearing having a unique configuration. The main advantage of the magnetic suspension bearing is that spacers are provided in air gaps and covers made of non-magnetic material served as dampers so that impact forces are absorbed and limited.

Therefore, the present invention intends to provide a magnetic bearing to overcome the mentioned disadvantages so as to be well received in the related industry.

SUMMARY OF THE INVENTION

It is the objective of the present invention to provide a magnetic bearing to minimize the mechanical friction between a spindle and a bearing so that life of the bearing is prolonged.

It is another objective of the present invention to provide a magnetic bearing such that the magnetic bearing is appropriately designed to prevent magnetic-flux-leakage, thereby creating a highly-efficient bearing.

It is a further objective of the present invention to provide a magnetic bearing that is easy to assemble so that cost and time related to the manufacturing of the magnetic bearing is low.

In accordance with these and other objectives of the invention, the magnetic bearing comprises a base, a spindle rotatably mounted onto the base and a magnetic portion mounted between the base and the spindle to provide a magnetic repulsion that suspends the spindle. A retaining portion is mounted on the base and between a tip end of the spindle and the base to support the spindle.

BRIEF DESCRIPTION OF THE DRAWINGS

Additional objectives and features of the present invention will be more apparent from the following detailed description and appended claims when taken in conjunction with the drawings, wherein:

DETAILED DESCRIPTION OF THE PREFERRED EMBODIMENT

A magnetic bearing in accordance with the present invention main includes a base, a spindle mounted on the base, and a magnetic suspending portion. The magnetic suspending portion is located between the base and the spindle, whereby using magnetic repulsion the mechanical friction between the base and the spindle is minimized. A retaining portion is further mounted on the base and between a tip end of the spindle and the base for supporting the spindle.

Figure 1:
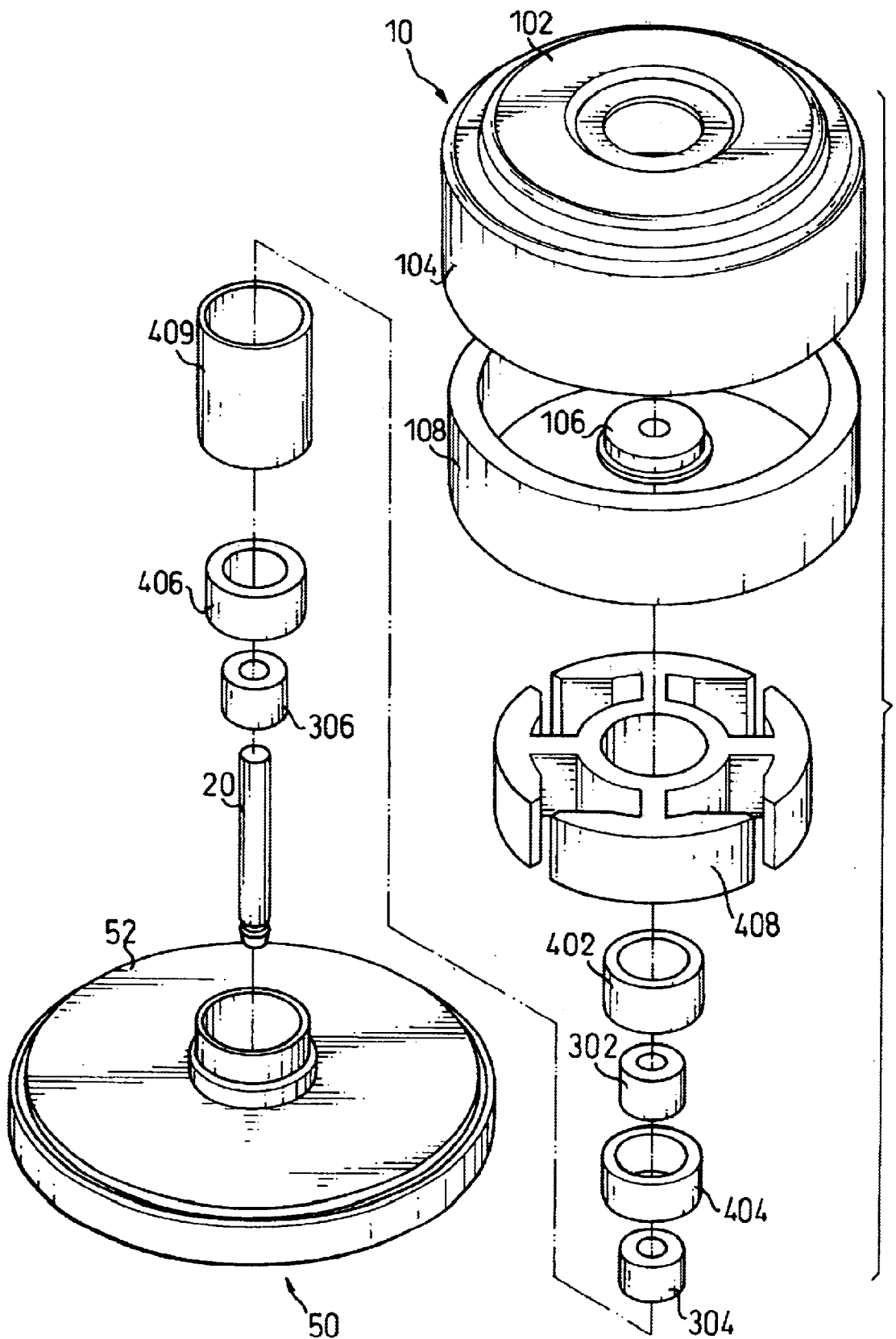
FIG. 1 is an exploded, perspective view of a magnetic bearing in accordance with the present invention.
Figure 2:
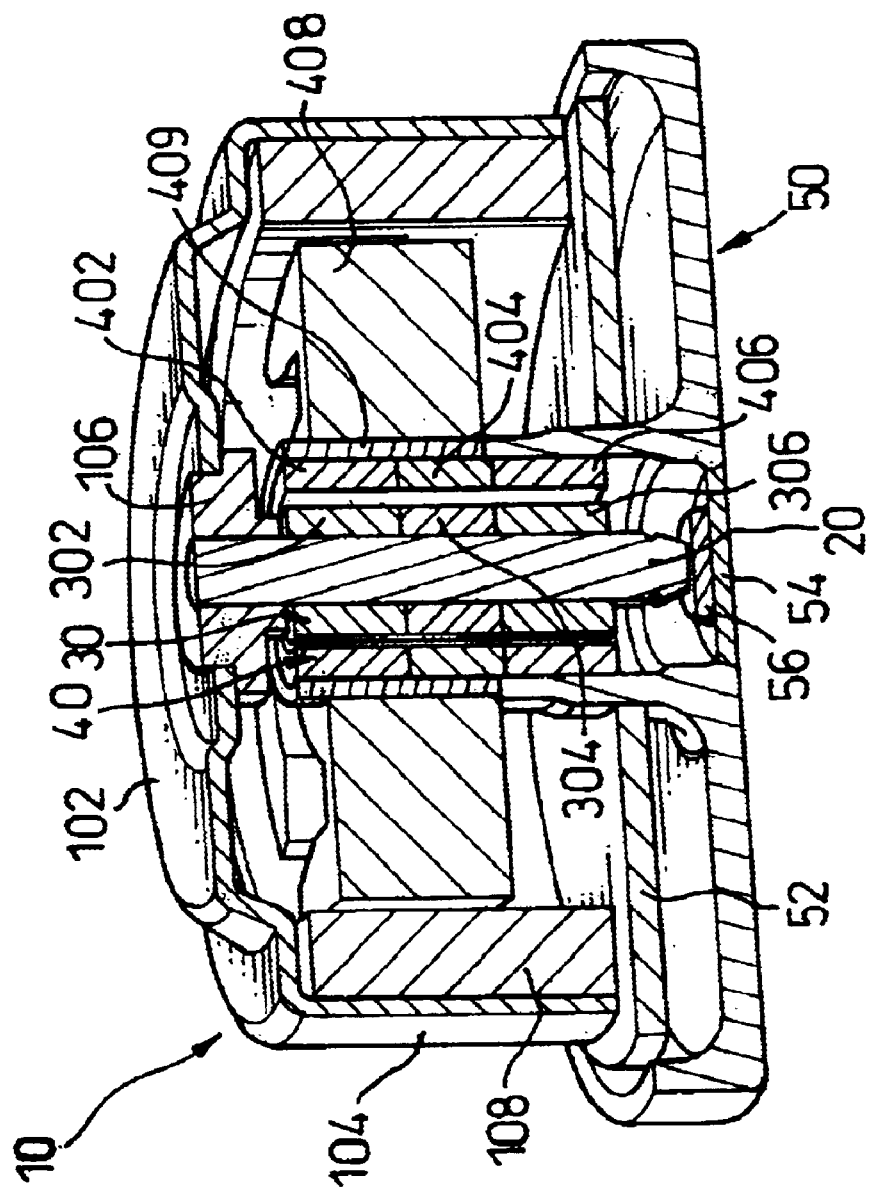
FIG. 2 is a perspective view of the magnetic bearing in assembly.

In order to specifically illustrate the present invention, a preferred embodiment of the magnetic bearing when applied onto a motor is depicted in the description and figures. With reference to FIGS. 1 and 2, the magnetic bearing in this preferred embodiment consists of a rotor and a stator, wherein the rotor is the rotation part and the stator is the static part of the bearing. The rotor includes a yoke (10), a spindle (20) and an inner magnetic portion (30), and the stator includes an outer magnetic portion (40) and a base (50).

The yoke (10) is made of magnetic material and has a top surface (102) and a circumferential wall (104). A sleeve (106) is securely mounted at the center of the top surface (102) and around an end of the spindle (20) so that the yoke (10), the sleeve (106) and the spindle (20) are coupled together. A magnet (108) having a ring-shape and made of a permanent magnet is attached to an inner side of the circumferential wall (104) so that magnetic force of the magnet (108) is restricted inside the yoke (10) to reduce magnetic-flux-leakage.

The inner magnetic portion (30) is securely mounted around the spindle (20), and is composed of an upper-inner ring (302), an inner-magnetic ring (304) and a lower-inner ring (306). The inner-magnetic ring (304) is made of a permanent magnet and located between the upper-inner ring (302) and the lower-inner ring (306). The upper-inner ring (302) is located close to the yoke (10). The upper-inner ring (302) and the lower-inner ring (306) are both coated with non-magnetic material to guide the magnetic force generated by the inner-magnetic ring (304).

The base (50) is assembled onto an opening of the yoke (10). A circuit board (52) is mounted on the base (50). The outer magnetic portion (40) having a tube-shape is mounted on the center of the base (50) and extending into the yoke (10) to be mount around the inner magnetic portion (30). The outer magnetic portion (40) and the inner magnetic portion (30) together form a magnetic portion. The outer magnetic portion (40) is composed of an upper-outer ring (402), an outer magnetic ring (404) and a lower-outer ring (406), wherein the outer-magnetic ring (404) is made of a permanent magnet. The inner magnetic portion (30) is received in the outer magnetic portion (40) in a manner that the outer-magnetic ring (404) locates adjacent to the inner-magnetic ring (304) so the inner magnetic portion (30) and the outer magnetic portion (40) together form the magnetic portion. The upper-outer ring (402) and the lower-outer ring (406) are both coated with non magnetic material, and are respectively located adjacent to the upper-inner ring (302) and the lower-inner ring (306) to guide the magnetic force generated by the outer-magnetic ring (404). FurthermOre, the inner-magnetic ring (304) and the outer-magnetic ring (404) magnetically repulse each other so that the inner magnetic portion (30) and the spindle (20) are suspended in the outer-magnetic portion (40). In addition, a core (408) having windings (not shown) is securely mounted around the outer magnetic portion (40) and a barrel (409) is firmly sandwiched between the core (408) and the outer magnetic portion (40), wherein the barrel (409) is made of non-magnetic material so that magnetic forces generated by the inner magnetic portion (30) and the outer magnetic portion (40) are confined inside the barrel (409). A retaining portion (54) is mounted on the center of the base (50) and includes a retaining piece (54) and an engaging piece (56) such that these two pieces (54 and 56) together support a tip end of the spindle (20).

When the windings are electrified, the core (408) becomes a temporary magnet and interacts with the magnet (108) so that the rotor spins accordingly. Due to the repulsion between the inner magnetic ring (304) and the outer magnetic ring (404), the inner magnetic portion (30) and the outer magnetic portion (40) do not engage during the spinning of the rotor. Therefore, mechanical friction in the magnetic bearing is minimized.

It is noted from the above description, the magnetic bearing in accordance with the present invention is appropriately designed to reduce magnetic-flux-leakage so that the magnetic-flux is efficiently utilized and the mentioned result has been proven using finite element analysis. Moreover, the magnetic bearing can be conveniently assembled and uses radially-charged magnets which are easy to mass-produce. Therefore, cost and time related to the manufacturing of the magnetic bearing are low. It should be also noted that the magnetic bearing can be widely applied to various kinds of motor, for example, a motor of a CD-ROM device or a motor of a heat-dissipating fan.

While this invention has been particularly shown and described with references to the preferred embodiment thereof, it will be understood by those skilled in the art that various changes in form and details may be made therein without departing from the scope of the invention encompassed by the appended claims.

What is claimed is:

1. A magnetic bearing comprising:

a base;

a spindle freely and rotatably supported on the base;

a magnetic portion mounted on the base and around the spindle to provide a magnetic repulsion that suspends the spindle; wherein the magnetic portion comprises an inner-magnetic portion securely mounted around the spindle and an outer magnetic portion located around the inner magnetic portion and securely mounted onto the base so that the magnetic repulsion is created between the inner magnetic portion and the outer magnetic portion to radially suspend the spindle;

wherein the inner-magnetic portion comprises and upper-inner ring, an inner-magnetic ring and a lower-inner ring, the inner-magnetic ring is made of a permanent magnet and is mounted between the upper-inner ring and the lower-inner ring to repulse against the outer magnetic portion so as to stand the spindle on the base; and a retaining portion mounted on the base and between a tip end of the spindle and the base to support the spindle.

2. The magnetic bearing as claimed in claim 1, wherein the outer-magnetic portion further comprises an upper-outer ring, an outer-magnetic ring and a lower-outer ring, the outer magnetic ring is made of the permanent magnet and mounted between the upper-outer ring and the lower-outer ring to repulse against the inner-magnetic ring so as to stand the spindle on the base and wherein the upper-inner ring, the lower-inner ring, the upper-outer ring and lower-outer ring are made of a magnetic material.

3. The magnetic bearing as claimed in claim 2, wherein the upper-inner ring, the lower-inner ring, the upper-outer ring and lower-outer ring are made of a magnetic material.

4. The magnetic bearing as claimed in claim 3, wherein the upper-inner ring, the lower-inner ring, the upper-outer ring and lower-outer ring are coated with a non-magnetic material.

5. A magnetic bearing comprising:

a yoke made of a magnetic material and having a top surface and a circumferential wall;

a magnet firmly attached to an inner side of the circumferential wall;

a spindle having a tip end and a connecting end opposed to the tip end, wherein the connecting end is securely connected to a center of the top surface;

an inner magnetic portion securely mounted around the spindle;

a base having a circuit board;

an outer magnetic portion securely mounted on the base and located around the inner magnetic portion, wherein the inner magnetic ring and the outer magnetic ring create a repulsion to suspend the spindle;

wherein the inner-magnetic portion comprises an upper-inner ring, an inner-magnetic ring and a lower-inner ring, the inner-magnetic ring is made of a permanent magnet and is mounted between the upper-inner ring and the lower-inner ring to repulse against the outer magnetic portion so as to stand the spindle on the base;

a core securely mounted around the outer magnetic portion and having windings mounted therearound; and a retaining portion mounted on the base and between the tip end of the spindle and the base to support the spindle.

6. The magnetic bearing as claimed in claim 5, wherein the outer-magnetic portion further comprises an upper-outer ring, an outer-magnetic ring and a lower-outer ring, the outer magnetic ring is made of the permanent magnet and mounted between the upper-outer ring and the lower-outer ring to repulse against the inner-magnetic ring so as to stand the spindle on the base.

7. The magnetic bearing as claimed in claim 6, wherein the upper-inner ring, the lower-inner ring, the upper-outer ring and lower-outer ring are made of a magnetic material.

8. The magnetic bearing as claimed in claim 7, wherein the upper-inner ring, the lower-inner ring, the upper-outer ring and lower-outer ring are coated with a non-magnetic material.

9. The magnetic bearing as claimed in claim 8 further comprising a barrel firmly sandwiched between the core and the outer magnetic portion to confine magnetic forces generated by the inner magnetic portion and the outer portion inside the barrel.

* * * * *